(12) United States Patent
Tainaka

(10) Patent No.: US 11,369,098 B2
(45) Date of Patent: Jun. 28, 2022

(54) ARTIFICIAL BAIT AND SPLIT RING THEREFOR

(71) Applicant: GLOBERIDE, Inc., Tokyo (JP)

(72) Inventor: Yuki Tainaka, Higashi Kurume (JP)

(73) Assignee: GLOBERIDE, Inc., Tokyo (JP)

(*) Notice: Subject to any disclaimer, the term of this patent is extended or adjusted under 35 U.S.C. 154(b) by 213 days.

(21) Appl. No.: 16/797,448

(22) Filed: Feb. 21, 2020

(65) Prior Publication Data

US 2020/0288686 A1 Sep. 17, 2020

(30) Foreign Application Priority Data

Mar. 12, 2019 (JP) .............................. JP2019-044637

(51) Int. Cl.
*A01K 85/00* (2006.01)
*A01K 91/03* (2006.01)

(52) U.S. Cl.
CPC .............. *A01K 85/00* (2013.01); *A01K 91/03* (2013.01)

(58) Field of Classification Search
CPC ........ A01K 85/00; A01K 91/03; A01K 91/04; A01K 95/02
USPC ....................................................... 43/42.08
See application file for complete search history.

(56) References Cited

U.S. PATENT DOCUMENTS

| | | | | |
|---|---|---|---|---|
| 730,064 A * | 6/1903 | Wilson | ................... | A01K 91/04 43/42.49 |
| 2,981,029 A * | 4/1961 | Markoff-Moghadam | ................... | A01K 91/03 24/131 R |
| 3,340,595 A * | 9/1967 | Hoadley | ................ | A01K 91/03 29/241 |
| 4,112,608 A * | 9/1978 | McGahee | .............. | A01K 85/16 43/42.09 |
| 4,965,957 A * | 10/1990 | Hnizdor | ................ | A01K 83/00 43/44.82 |
| 5,579,600 A * | 12/1996 | Burns | .................... | A01K 91/04 43/43.16 |
| 5,689,911 A * | 11/1997 | Lin | ........................ | A01K 83/00 43/43.16 |
| 5,915,946 A * | 6/1999 | Nakajima | .............. | A01K 91/04 D3/207 |
| 6,460,225 B1 | 10/2002 | Brault | | |
| 7,735,257 B1 | 6/2010 | Firmin | | |
| 9,072,285 B1 * | 7/2015 | Rye | ........................ | A01K 85/00 |

(Continued)

FOREIGN PATENT DOCUMENTS

| | | |
|---|---|---|
| AU | 2002 301 028 A1 | 2/2003 |
| CA | 3004994 A1 * | 11/2019 |

(Continued)

OTHER PUBLICATIONS

Chinese Office Action for related Chinese Application No. 202010081498.4; action dated Jul. 30, 2021; (12 pages).

(Continued)

*Primary Examiner* — Christopher P Ellis
(74) *Attorney, Agent, or Firm* — K&L Gates LLP

(57) ABSTRACT

An artificial bait with a split ring has a high tensile strength and an easily detachable hook and prevents the hook from freely rotating in water. In the artificial bait provided with the split ring with the replaceable hook, the split ring is characterized in that at least one end of the wire formed in a ring shape is curved in a direction away from the intermediate portion.

5 Claims, 7 Drawing Sheets

Front View

(56) References Cited

U.S. PATENT DOCUMENTS

| | | | |
|---|---|---|---|
| 9,241,481 B1* | 1/2016 | Jackson, III | A01K 85/12 |
| 2006/0185221 A1 | 8/2006 | Burns | |
| 2010/0058642 A1 | 3/2010 | Hatfield | |
| 2010/0325939 A1* | 12/2010 | Frayne | A01K 91/047 24/131 R |
| 2012/0036762 A1* | 2/2012 | Veith | A01K 83/00 43/44.83 |
| 2014/0237889 A1* | 8/2014 | Tamburro | A01K 85/00 43/42.09 |
| 2015/0208624 A1* | 7/2015 | Krohn | A01K 85/00 43/42.49 |
| 2015/0223437 A1* | 8/2015 | Tamburro | A01K 85/14 43/42.36 |
| 2015/0250153 A1* | 9/2015 | Storm | A01K 85/16 43/42.31 |
| 2016/0057981 A1* | 3/2016 | Beecher | A01K 83/00 43/43.12 |
| 2016/0081318 A1* | 3/2016 | Rothan | A01K 91/047 43/44.9 |
| 2017/0150706 A1* | 6/2017 | Jung | A01K 85/16 |
| 2017/0159698 A1* | 6/2017 | Locker | A01K 91/04 |
| 2017/0290314 A1* | 10/2017 | Forbes | A01K 91/047 |
| 2019/0116775 A1* | 4/2019 | Leigh | A01K 85/00 |
| 2019/0246613 A1* | 8/2019 | Cook | A01K 91/04 |

FOREIGN PATENT DOCUMENTS

| | | | |
|---|---|---|---|
| CN | 203505356 U | | 4/2014 |
| CN | 204599064 U | | 9/2015 |
| EP | 923860 A1 | * | 12/1997 |
| EP | 0923860 A1 | * | 6/1999 ............. A01K 83/00 |
| EP | 923860 A1 | * | 6/1999 ............. A01K 83/00 |
| EP | 3711480 A1 | * | 9/2020 ............. A01K 85/00 |
| JP | 3021827 | | 12/1995 |
| JP | H10-84825 A | | 4/1998 |
| JP | 2004135510 A | | 5/2004 |
| JP | 2006174724 A | * | 7/2006 |
| JP | 2007282554 A | * | 11/2007 |
| JP | 3142982 U | * | 7/2008 |
| JP | 4848057 B1 | * | 12/2011 |
| JP | 3-177420 U | | 8/2012 |
| JP | 5288389 B1 | * | 9/2013 |
| JP | 3216468 U | * | 5/2018 |
| JP | 3228605 U | * | 11/2020 |
| JP | 2021159031 A | * | 10/2021 |
| JP | 2021159031 A | * | 11/2021 |
| KR | 20170001194 U | | 4/2017 |
| WO | WO-9834475 A1 | * | 8/1998 ............. A01K 91/04 |
| WO | WO-0181795 A2 | * | 11/2001 ............. A01K 91/03 |
| WO | WO-2015001588 A1 | * | 1/2015 ............. A01K 85/00 |
| WO | WO-2015085331 A1 | * | 6/2015 ............. A01K 91/03 |
| WO | WO-2018155108 A1 | * | 8/2018 ............. A01K 85/00 |

OTHER PUBLICATIONS

The Extended European Search Report dated Aug. 24, 2020, of counterpart European Application No. 20159130.2.

Second Office Action for related Chinese Application No. 202010081498.4; action dated Jan. 28, 2022; (7 pages).

Japanese Office Action for related Japanese Application No. 2019-044637; action dated Mar. 10, 2022; (8 pages).

* cited by examiner

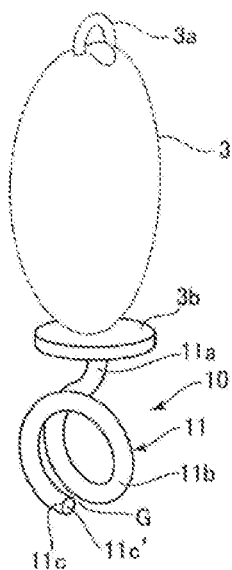
FIG. 2(A) Perspective View
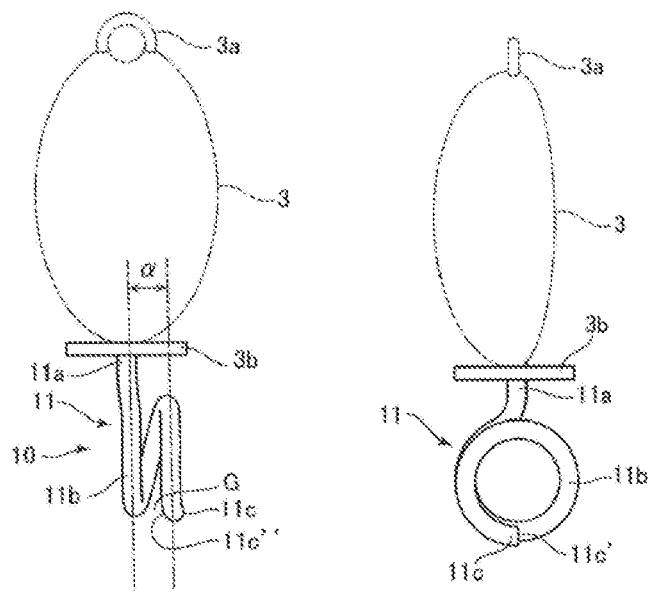
FIG. 2(B) Front View     FIG. 2(C) Side View

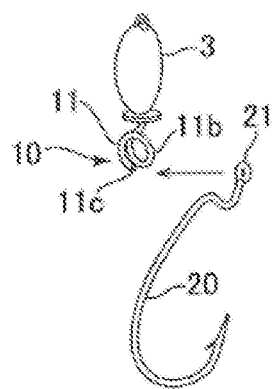
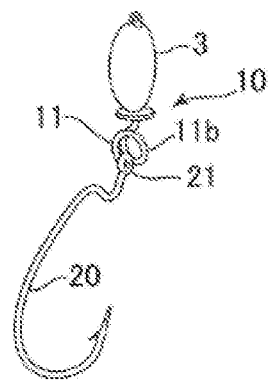
FIG. 3(a)　　　　　　　　FIG. 3(b)
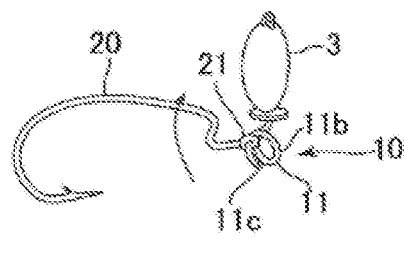
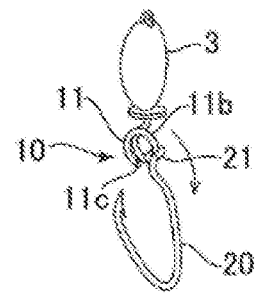
FIG. 3(c)　　　　　　　　FIG. 3(d)
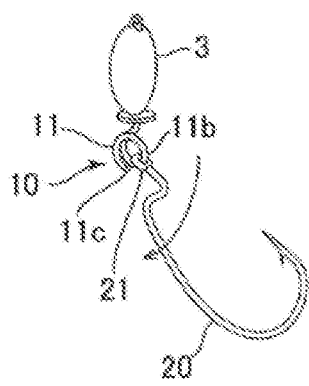
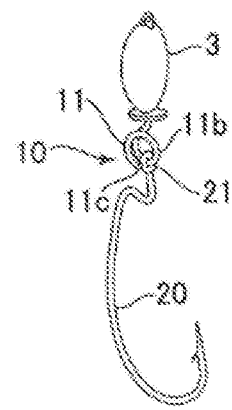
FIG. 3(e)　　　　　　　　FIG. 3(f)

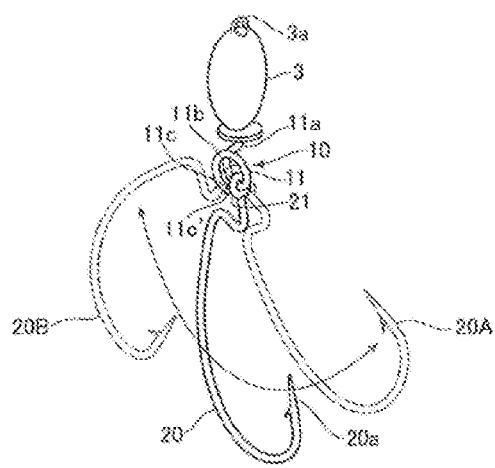
FIG. 4(A) Forward-backward
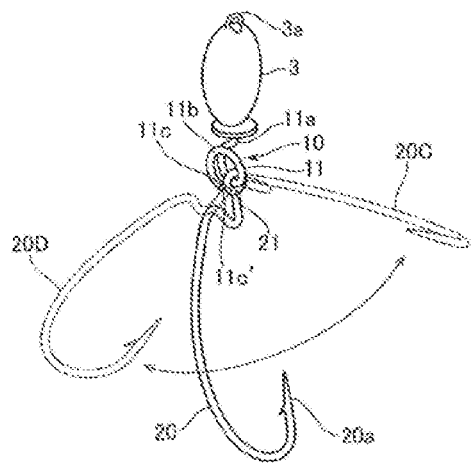
FIG. 4(B) Side-to-side

ARTIFICIAL BAIT AND SPLIT RING THEREFOR

TECHNICAL FIELD

This disclosure relates to an artificial bait such as a lure and a jig head used in fishing and, more specifically, relates to an artificial bait featuring a split ring having a detachable hook (fishing hook), as well as a split ring for the artificial bait.

BACKGROUND

A split ring is attached to artificial bait so that different types of hooks can be attached to and detached from the bait as necessary. The split ring is formed by curving a linear member in a ring shape, and the one disclosed in Japanese Utility Model Registration No. 3021827, for example, is generally known. The split ring disclosed in Japanese Utility Model Registration No. 3021827 will be described with reference to FIGS. 7(A) and 7(B). Normally, a split ring 100 has a configuration in which both ends 101a and 101b of a wire 101 are wound approximately twice to be in close contact with an intermediate portion 102, and one of the ends is forcibly separated from the intermediate portion, and keeping this state, a ring portion 111 of a hook 110 is fitted into the end of the wire and moved along the intermediate portion, whereby the hook 110 is attached. Similarly, when the hook 110 is detached, the end 101a (101b) of the split ring and the intermediate portion 102 are forcibly separated from each other, and the ring portion 111 of the hook 110 is fitted into the gap and moved along the intermediate portion, whereby the hook 110 is detached.

Japanese Utility Model Registration No. 3021827 also discloses a connecting eye having a configuration in which a wire is wound approximately once and an end is slightly separated from a base end. When such a connecting eye is used as a detachable structure for a hook, it is not necessary to expand the end when attaching the ring portion of the hook so that the hook can be easily attached and detached.

In a conventional split ring, when attaching or detaching the ring portion of the hook, it is necessary to expand the end of the split ring from the intermediate portion (expanding the end using a tool such as a plier). Therefore, the hook is not easily attached and detached. In addition, when the hook is attached, the ring portion can freely rotate in the split ring, which makes the hook easily turn in various directions in water, and makes the hooking performance poor. Further, in a type where the wire is wound approximately once, though the hook can be relatively easily attached and detached, the tensile strength is weak, and similarly to the above-mentioned configuration, the hook easily turns in various directions in water, which makes the hooking performance poor.

It could therefore be helpful to provide an artificial bait provided with a split ring having a high tensile strength and an easily detachable hook and that prevents the hook from freely rotating in water, as well as to provide a split ring attached to the artificial bait.

SUMMARY

I thus provide an artificial bait characterized in that it has a split ring with a replaceable hook, and at least one end of a wire formed in a ring shape is curved in a direction that separates the end from an intermediate portion.

In the artificial bait having the above-described configuration, when the hook is attached by inserting the ring portion of the hook into the split ring, since at least one end of the wire of the split ring formed in the ring shape is separated from the intermediate portion, it is not necessary to separate the end from the intermediate portion by using a tool as in conventional split rings, whereby the hook can be easily attached. Further, even if the hook is attached and the ring portion is moved along the split ring, the ring portion abuts against the curved end of the split ring so that the movement of the hook in the rotational direction and the lateral direction is restricted. That is, the hook is prevented from freely moving in water, and the direction of the hook tip is stabilized, whereby the performance of hooking fish is improved.

I also provide a split ring attachable to an artificial bait as described above, and the split ring is characterized in that at least one end of a wire formed in a ring shape is curved to be separated from the intermediate portion.

The artificial bait is provided with a split ring having a high tensile strength and an easily detachable hook and that prevents the hook from freely rotating in water, and a split ring attached to the artificial bait.

BRIEF DESCRIPTION OF THE DRAWINGS

FIGS. 2(A)-2(C) show views illustrating a split ring for the artificial bait shown in FIGS. 1(A) and 1(B). (A) is a perspective view, (B) is a front view, and (C) is a side view.

FIGS. 3(a) to 3(f) show a procedure for attaching a hook to a split ring in order.

FIGS. 4(A) and 4(B) show a diagram illustrating a state in which the movement of the attached hook is restricted by the split ring.

DESCRIPTION OF THE NUMERICAL REFERENCES 1, 1A Artificial baits
10 Split ring
11 Wire
11a Base portion (end)
11b Intermediate portion
11c Tip portion (end)
20, 30 Hooks
21, 31 Ring portions

DETAILED DESCRIPTION

Examples of an artificial bait will be described below.

Figures 1A, 1B:
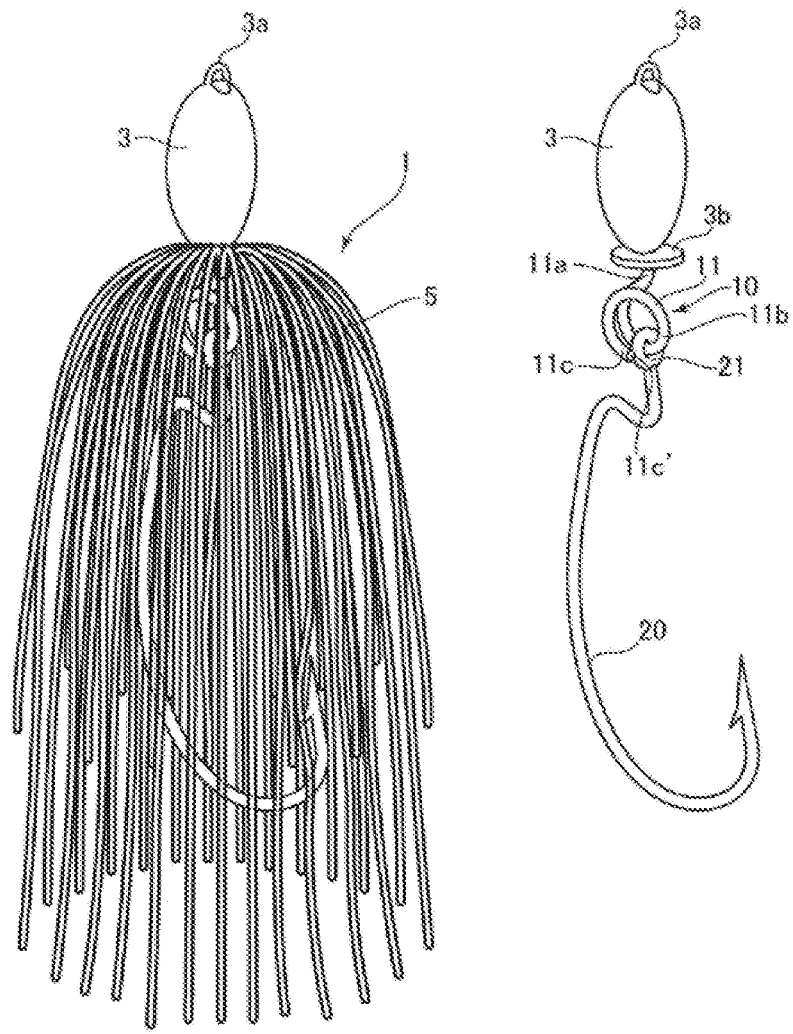
FIGS. 1(A) and 1(B) show a first example of an artificial bait. (A) is a perspective view illustrating the overall configuration, and (B) is a perspective view illustrating a state after a rubber is removed.

FIGS. 1(A) and 1(B) show a first example of an artificial bait.

An artificial bait 1 shown in FIG. 1(A) is a so-called jig head, and is configured by attaching a large number of rubbers 5 to hang on a sinker 3 on which an eye 3a to which a fishing line is tied is formed.

A split ring 10 is integrally attached to the sinker 3 on the side opposite to the position where the eye 3a is provided, and a ring portion 21 formed on a hook 20 is attached to the split ring 10. As will be described later, the split ring 10 has a shape in which the hook 20 can be easily attached and detached and which can restrict the movement of the hook.

As shown in FIGS. 2(A) to 2(C), the split ring 10 is formed by bending a metallic wire 11 into a ring shape. In this example, the wire 11 to be used has a diameter that is smaller than the opening diameter of the ring portion 21 of the hook 20 and is as large as possible under such constraint. More specifically, though the diameter of the wire 11 depends on the opening diameter of the ring portion 21 of the hook 20, a wire is used, which is thick (approximately 0.5 to 2.0 mm) enough to ensure sufficient strength even where a large tensile force is applied when fish is caught. Further, as described below, as the wire 11 is wound more than once (winding amount greater than) 360°, it does not expand under the power of the hooked fish.

One end 11a (base end) of the wire 11 is integrally fixed to a base 3b of the sinker 3, from which point the end is wound more than once in a ring shape, and the other end (tip portion) 11c is wound to be separated from, without contacting the side of, the intermediate portion 11b wound in a ring shape. In particular, the wire 11 is wound approximately once and a half (approximately 540°) so that the tip portion 11c is not expanded under the power of the hooked fish and, when winding the wire, the wire is formed in a curve so that an angle α (bending angle) between a plane P including the intermediate portion 11b and the direction in which the tip portion 11c is facing (direction away while curving toward the tip) is more than a certain value. Therefore, a certain gap G is formed between the tip portion 11c and the intermediate portion 11b by curving the wire 11 to form the angle α.

If the wire described above is curved so that the angle α becomes large, the ring portion 21 of the hook 20 can be easily passed therethrough. It is therefore preferable that the angle α is a certain angle or more to be slightly separated from the intermediate portion. Specifically, the angle α is preferably set at 10° or more so that the ring portion 21 of the hook 20 can be passed as is even if the ring portion 21 has a certain thickness, which makes it possible to pass the ring portion 21 of the hook 20 through the tip portion 11c smoothly toward the intermediate portion without using a tool or the like. The upper limit of the angle α is not particularly specified, but may be curved at 90° or less.

Referring to FIGS. 3(a) to 3(f), a procedure for attaching the hook 20 on the split ring 10 with the above-described configuration will be described.

First, the ring portion 21 of the hook 20 is inserted from the tip portion 11c of the split ring (see FIGS. 3(a) and 3(b)). In this operation, since the tip portion 11c is separated from the intermediate portion 11b of the wire to form a gap, the ring portion 21 can be easily passed through the split ring without using a tool. Thereafter, the hook 20 is pinched and rotated along the wire (see FIGS. 3(c) to 3(e)) so that the hook 20 is attached to the split ring 10 (see FIG. 3(f)). The hook 20 can be easily detached by pinching the hook 20 and following the reverse procedure to attaching the hook.

When the hook 20 is attached to the split ring 10 according to the above-described procedure, if the angle α is small, the ring portion 21 of the hook 20 abuts on an end face 11c' of the tip portion 11c, which prevents the hook 20 from largely rotating along the intermediate portion 11b. That is, as shown in FIG. 4(A), though the rotational movement can be performed from the position of the solid line to the position on the front side shown by the double-chain line 20A, the rotational movement from the position of the solid line to the position on the back side shown by the double-chain line 20B is prevented. Consequently, the hook can, without rotating backward, rotate in the forward direction in which fish is easily caught, which makes it easier to hook fish. In this example, even if the angle α is formed to be slightly largely curved, since the ring portion 21 of the hook abuts on an inner surface 11c'' (see FIG. 2(B)) near the tip portion 11c, the backward rotation is similarly restricted, and the hook is prevented from rotating backward.

Further, on the back side of the end face 11c' of the tip portion of the split ring 10, the movement in the side-to-side direction as illustrated by a double chain line in FIG. 4(B) (side-to-side direction as illustrated by the double chain lines 20C and 20D) is also restricted by the restrictions described above.

Therefore, when the hook 20 is attached to the split ring 10 having the above-described configuration, the rotation in the forward-backward direction and the movement in the side-to-side direction are restricted from the tip portion 11c of the wire, whereby a hook tip 20a of the hook 20 is easily maintained upward in water, which improves the hooking performance.

Figure 5:
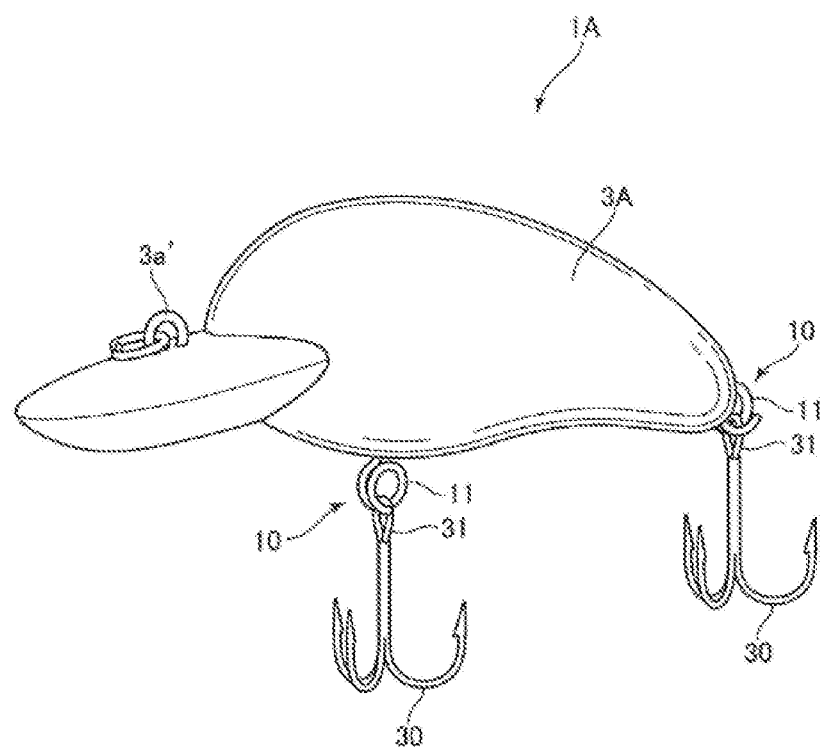
FIG. 5 shows a perspective view indicating a second example of an artificial bait.

FIG. 5 shows a second example of an artificial bait. An artificial bait 1A of this example is configured as a lure type, and a hook 30 is attached thereon by attaching the split rings 10 having the above-described configuration to two positions on the underside of a body 3A. Also, in the configuration of this example, the ring portion 31 of the hook 30 can be easily attached to and detached from the split ring 10, and when a fishing line is tied to an eye 3a' on a main body 3A and an action is applied to the lure while winding up a reel, the rotation in the forward-backward direction and movement in the side-to-side direction of the hook 30 are restricted as described above so that the attitude of the lure is stabilized in water, which makes it easier to catch the fish (ability to increase the chance of fish preying on baits is improved).

Figure 7A:
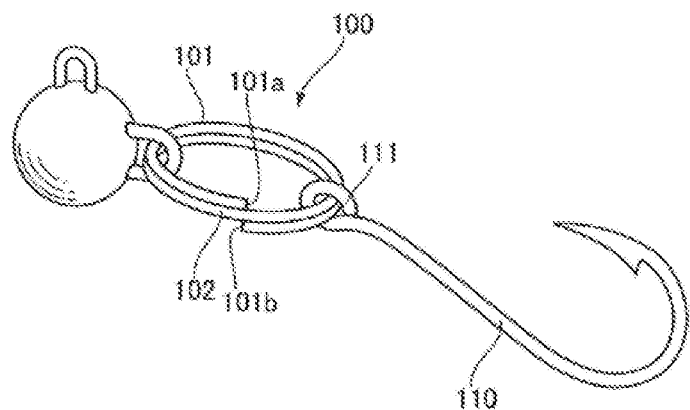
FIGS. 7(A) and 7(B) show a configuration of a conventional split ring. (A) is a perspective view illustrating a state in which a hook is attached, and (B) is a perspective view illustrating a state in which the hook is detached.
Figure 7B:
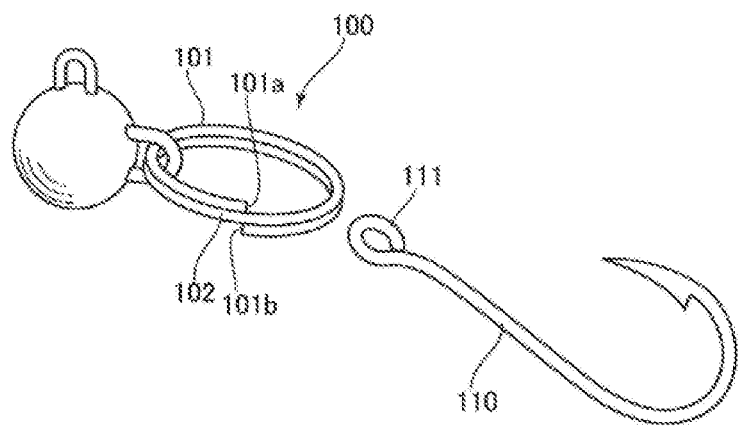

The examples are described above. However, this disclosure is not limited to the above-described examples, and various variation may be made. In the examples described above, one end (base end) of the wire of the split ring 10 is attached to the body of the artificial bait, but similarly to the configuration shown in FIGS. 7(A) and 7(B), the intermediate portion of the split ring 10 may be attached to the body of the artificial bait, and the both ends of the wire may be curved to be separated from the intermediate portion 11b. Such a configuration makes it easier to attach or detach the hook. Further, when the wire 11 is curved to form a ring shape, the number of turns (amount of windings) is not particularly limited to two turns or the like as shown in FIGS. 7(A) and 7(B), and the amount of windings can be increased to improve the tensile strength.

Figure 6A:
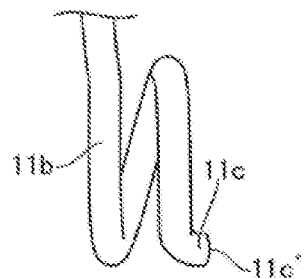
FIGS. 6(A) to 6(C) show a diagram indicating various modifications of the end shape of the split ring.
Figure 6B:
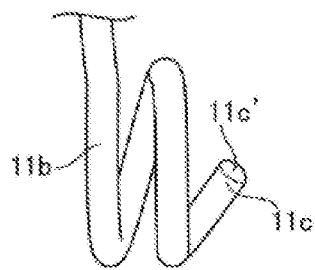
Figure 6C:
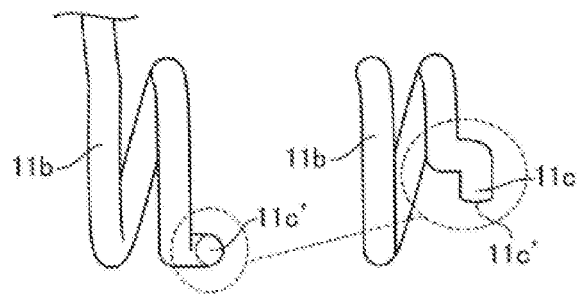

With respect to the split ring, it suffices that at least one end of the wire formed in a ring shape is curved in the direction away from the intermediate portion, which can be done in many different ways. For examples of the deformations made as necessary, only the end face 11c' of the tip portion 11c is sharply bent and separated from the intermediate portion 11b as shown in FIG. 6(A), the end face 11c' of the tip portion 11c extends upward while being separated from the intermediate portion 11b as shown in FIG. 6(B), or the tip portion 11c is bent into a substantially right angle (dogleg shape) to be separated from the intermediate portion 11b as shown in FIG. 6(C).

Further, an example can include the split ring 10 itself having the above-described configuration. Such a split ring may be provided at a place to which a hook or other device component on which a ring portion is formed in advance is connected when a user prepares a device, which makes it easier to prepare the device.

What is claimed is:

1. An artificial bait comprising:
   a split ring comprising a wire formed in a ring shape; and
   a replaceable hook,
   wherein at least one end of the wire is curved in a direction away from an intermediate portion of the wire,
   wherein the at least one end of the wire is bent at 10° or more with respect to a plane including the intermediate portion.

2. The artificial bait according to claim 1, wherein a ring portion of the replaceable hook is attached to the split ring and is restricted in its rotational movement by the at least one end of the wire.

3. The artificial bait according to claim 1, wherein the wire is wound greater than 360°.

4. A split ring for being attached to an artificial bait and detachably replacing a hook, the split ring comprising a wire formed in a ring shape,
   wherein at least one end of the wire is curved in a direction away from an intermediate portion of the wire,
   wherein the at least one end of the wire is bent at 10° or more with respect to a plane including the intermediate portion.

5. The split ring according to claim 4, wherein the wire is wound at greater than 360°.

* * * * *

UNITED STATES PATENT AND TRADEMARK OFFICE
CERTIFICATE OF CORRECTION

Page 1 of 1

PATENT NO. : 11,369,098 B2
APPLICATION NO. : 16/797448
DATED : June 28, 2022
INVENTOR(S) : Yuki Tainaka It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 230 days.

Signed and Sealed this
Eleventh Day of February, 2025

Coke Morgan Stewart
*Acting Director of the United States Patent and Trademark Office*